(12) United States Patent
Baek

(10) Patent No.: US 7,511,778 B2
(45) Date of Patent: Mar. 31, 2009

(54) LIQUID CRYSTAL DISPLAY

(75) Inventor: Seung-Soo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 10/856,798

(22) Filed: Jun. 1, 2004

(65) Prior Publication Data

US 2005/0012872 A1 Jan. 20, 2005

(30) Foreign Application Priority Data

May 31, 2003 (KR) .................... 10-2003-0035030

(51) Int. Cl.
*G02F 1/1343* (2006.01)
(52) U.S. Cl. ..................... 349/38; 349/146
(58) Field of Classification Search ......... 349/144–146, 349/38–39
See application file for complete search history.

(56) References Cited

U.S. PATENT DOCUMENTS

| | | | |
|---|---|---|---|
| 5,745,207 A * | 4/1998 | Asada et al. | 349/141 |
| 6,172,729 B1 * | 1/2001 | Ikeda | 349/145 |
| 6,914,655 B2 * | 7/2005 | Yamazaki et al. | 349/141 |
| 2004/0201811 A1 * | 10/2004 | Jun | 349/146 |

FOREIGN PATENT DOCUMENTS

| | | |
|---|---|---|
| JP | 11242225 | 9/1999 |
| JP | 2000221532 | 8/2000 |
| JP | 2001194671 | 7/2001 |
| JP | 2002296610 | 10/2002 |
| KR | 2001-0087186 | 9/2001 |

OTHER PUBLICATIONS

Korean Patent Abstracts, Publication No. 1020010087186, Sep. 15, 2001, 1 p.

* cited by examiner

*Primary Examiner*—Dung T. Nguyen
(74) *Attorney, Agent, or Firm*—Haynes and Boone, LLP.; Jeffrey A. Hopkins

(57) ABSTRACT

A liquid crystal display includes a first substrate comprising a gate line; a pixel domain and a data line, the pixel domain forming a matrix comprising a pixel electrode, a storage capacitor, a reference side parallel to the gate line, and a pair of lateral sides which are parallel to each other and are inclined at a predetermined angle to the reference side, and the data line extends along the lateral sides, a second substrate disposed opposite to the first substrate and comprising a common electrode, and a liquid crystal layer which is operative in a vertical alignment mode and is sandwiched between the first and second substrates, wherein the pair of lateral sides respectively comprise a reduction section forming an angle with the reference side which is larger than the predetermined angle, the storage capacitor is placed within the reduction section and not extending out of the reduction section.

14 Claims, 5 Drawing Sheets

LIQUID CRYSTAL DISPLAY

CROSS-REFERENCE TO RELATED APPLICATIONS

This application claims the benefit of Korean Patent Application No. 2003-035030, filed May 31, 2003, in the Korean Intellectual Property Office, the disclosure of which is incorporated herein by reference.

BACKGROUND OF THE INVENTION

1. Field of the Invention

The present invention relates to a liquid crystal display (LCD), and more particularly, to an LCD comprising a gate line; a pixel domain forming a matrix on a substrate and comprising a pixel electrode, a storage capacitor, a reference side which is parallel to the gate line, and a pair of lateral sides which are parallel to each other and are inclined at a predetermined angle to the reference side; and a data line extended along the lateral sides.

2. Description of the Related Art

An LCD employs electrical and optical properties of a liquid crystal that their molecules are aligned by an applied electric field. In the LCD, an active element such as a thin film transistor (TFT), a metal insulator metal (MIM), a thin film diode (TFD), or etc., which shows a nonlinear behavior, is provided in a pixel arranged in a matrix and controls the pixel by using its switching property.

Such an LCD features a thin and small appearance and a low-power consumption advantageously, but has a weak point in that it is hard to offer a big size and a full color, enhance a contrast, have a wide viewing angle, etc.

To overcome the weak point of a TFT LCD as to a viewing angle, there have been used various technologies such as a multidomain technology, a phase compensating technology, an in-plane switching (IPS) mode, a vertical alignment (VA) mode, a light propagation adjusting technology, etc. Further, there have been developed a patterned vertical alignment (PVA) mode, a surrounding electrode (SE) mode, a ridge and fringe field multidomain homeotropic (RFFMH) mode, a lateral field induced vertical alignment (LFIVA) mode, etc., which are respectively resulted from applying other technologies such as a cholesteric dopant, a direction control electrode, a ridge, an aligning method using rubbing, etc. to a partially etched slit of a pixel electrode based on the multidomain technology in the VA mode.

Among the proposed technologies, it prevails that the liquid crystal molecules are aligned vertically to upper and lower substrates and the pixel electrode and a common electrode being opposite to the pixel electrode are formed with a slit or a ridge at predetermined intervals.

By the way, the ridge or the partially etched slit of the pixel electrode lowers an aperture ratio. To compensate the lowered aperture ratio, a super high aperture ratio structure has been proposed, wherein the super high aperture ratio structure causes the pixel electrode to be formed as wide as it can. However, the super high aperture ratio structure also causes the pixel electrodes to be so close to each other that a strong lateral electric field is created between the adjacent pixel electrodes. Therefore, the liquid crystal molecules existing on an edge of the pixel electrode are unsettled because of the lateral electric field, so that a problem may occur in a texture or light may stream.

SUMMARY OF THE INVENTION

Accordingly, it is an aspect of the present invention to provide an LCD in which load of a data line is decreased and a signal delay is reduced, thereby maximizing the aperture ratio and increasing the response speed.

The foregoing and/or other aspects of the present invention are achieved by providing an active matrix display comprising a gate line; a pixel domain forming a matrix on a substrate and comprising a pixel electrode, a storage capacitor, a reference side which is parallel to the gate line, and a pair of lateral sides which are parallel to each other and are inclined at a predetermined angle to the reference side; and a data line extended along the lateral sides, wherein the lateral sides has a reduction section and the storage capacitor is placed within the reduction section.

According to an aspect of the invention, the storage capacitor is disposed adjacent to the gate line.

According to an aspect of the invention, the pair of lateral sides comprises an angled part at which the inclined angle is changed, and the reduction section is disposed within the angled part.

According to an aspect of the invention, the reduction section is perpendicular to the reference side.

According to another aspect of the present invention, the above and/or other aspects may be also achieved by providing a liquid crystal display comprising a gate line; a pixel domain forming a matrix on a substrate and comprising a pixel electrode, a storage capacitor, a reference side which is parallel to the gate line, and a pair of lateral sides which are parallel to each other and are inclined at a predetermined angle to the reference side; a data line extended along the lateral sides; and a first passivation film formed on a source electrode connected to the data line and on a drain electrode opposite to the source electrode, wherein the pair of lateral sides respectively comprise a reduction sections inclined at an angle larger than the predetermined angle, and the storage capacitor is placed within the reduction section.

According to an aspect of the invention, the first passivation film comprises an organic insulator.

According to an aspect of the invention, the storage capacitor is disposed adjacent to the gate line.

According to an aspect of the invention, the pair of lateral sides comprises an angled part at which the inclined angle is changed, and the reduction section is disposed within the angled part.

According to an aspect of the invention, the reduction section is perpendicular to the reference side.

According to still another aspect of the present invention, the above and/other aspects may be also achieved by providing a liquid crystal display comprising a gate line formed on a first insulator substrate; a pixel domain forming a matrix on a substrate and comprising a pixel electrode, a storage capacitor, a reference side which is parallel to the gate line, and a pair of lateral sides which are parallel to each other and are inclined at a predetermined angle to the reference side; a data line which is extended along the lateral sides and is insulated from and crossed with the gate line; a TFT connected to the gate line, the data line and the pixel electrode; a common electrode formed on a second insulator substrate opposite to the first insulator substrate and comprising a slit; and a liquid crystal layer sandwiched between the first insulator substrate and the second insulator substrate, wherein the pair of lateral sides respectively comprise a reduction sections inclined at an angle larger than the predetermined angle, and the storage capacitor is placed within the reduction section.

According to an aspect of the invention, the storage capacitor is disposed adjacent to the gate line.

According to an aspect of the invention, the pair of lateral sides comprises an angled part at which the inclined angle is changed, and the reduction section is disposed within the angled part.

According to an aspect of the invention, the reduction section is perpendicular to the reference side.

Additional aspects and/or advantages of the invention will be set forth in part in the description which follows and, in part, will be obvious from the description, or may be learned by practice of the invention.

BRIEF DESCRIPTION OF THE DRAWINGS

These and other aspects and advantages of the present invention will become apparent and more readily appreciated from the following description of the embodiments, taken in conjunction with the accompany drawings of which.

DETAILED DESCRIPTION OF THE PREFERRED EMBODIMENT

Figure 1:
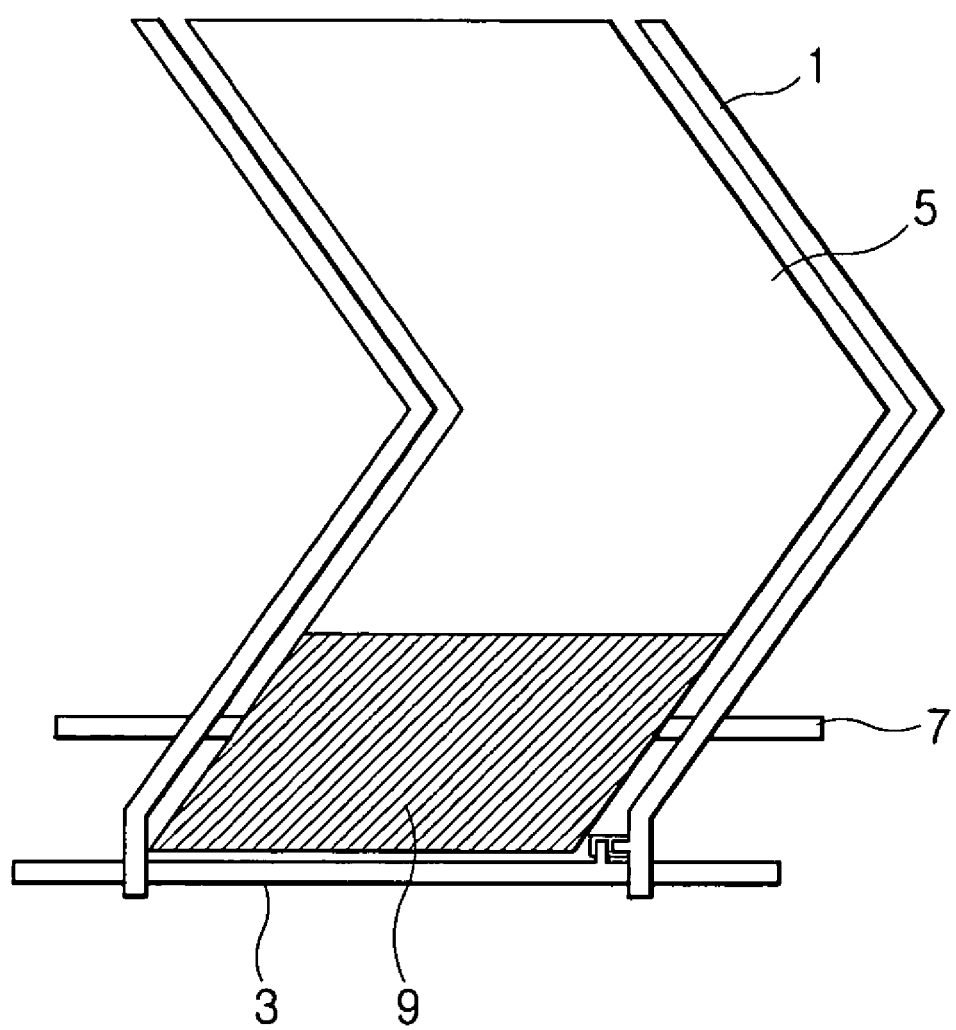
FIG. 1 is a plan view schematically illustrating a pixel of an LCD according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a plan view illustrating a pixel of a vertical alignment LCD which compensates an anisotropic refraction index n according to a viewing angle by allowing a pixel electrode and a data line to have an angled structure and aligning liquid crystal molecules differently in one pixel. Here, one pixel is exemplarily illustrated for convenience's sake. As shown in FIG. 1, the data line 1 and a gate line 3 have a matrix shape and surround a pixel domain. Further, the pixel domain comprises a pixel electrode 5 connected to a TFT element, and a common electrode line employed as a storage capacitor electrode 7.

Here, the matrix shape means a two-dimensional array including columns and rows, but it is not necessary to perpendicularly cross the data line 1 and the gate line 3.

A storage capacitor (Cst) 9 is employed for effectively keeping a first signal stored therein until a second signal is transmitted through the data line after the first signal and is classified into a "storage on common" type and a "storage on gate" type according to how a common electrode is formed: the "storage on common" type forms the common electrode of the Cst separately; and the "storage on gate" type uses a front part of the gate line as the common electrode of the Cst. In FIG. 1, the "storage on common" type storage capacitor is exemplarily illustrated.

Opposite sides of the storage capacitor 9 are parallel to the gate line 3, and other lateral sides thereof are parallel to the data line 1 at a predetermined angle to the gate line 3, so that the storage capacitor 9 is shaped like a parallelogram. Here, the larger the size of the pixel, i.e., the larger the size of a panel of the LCD, the larger the domain of the storage capacitor 9.

Figure 2:
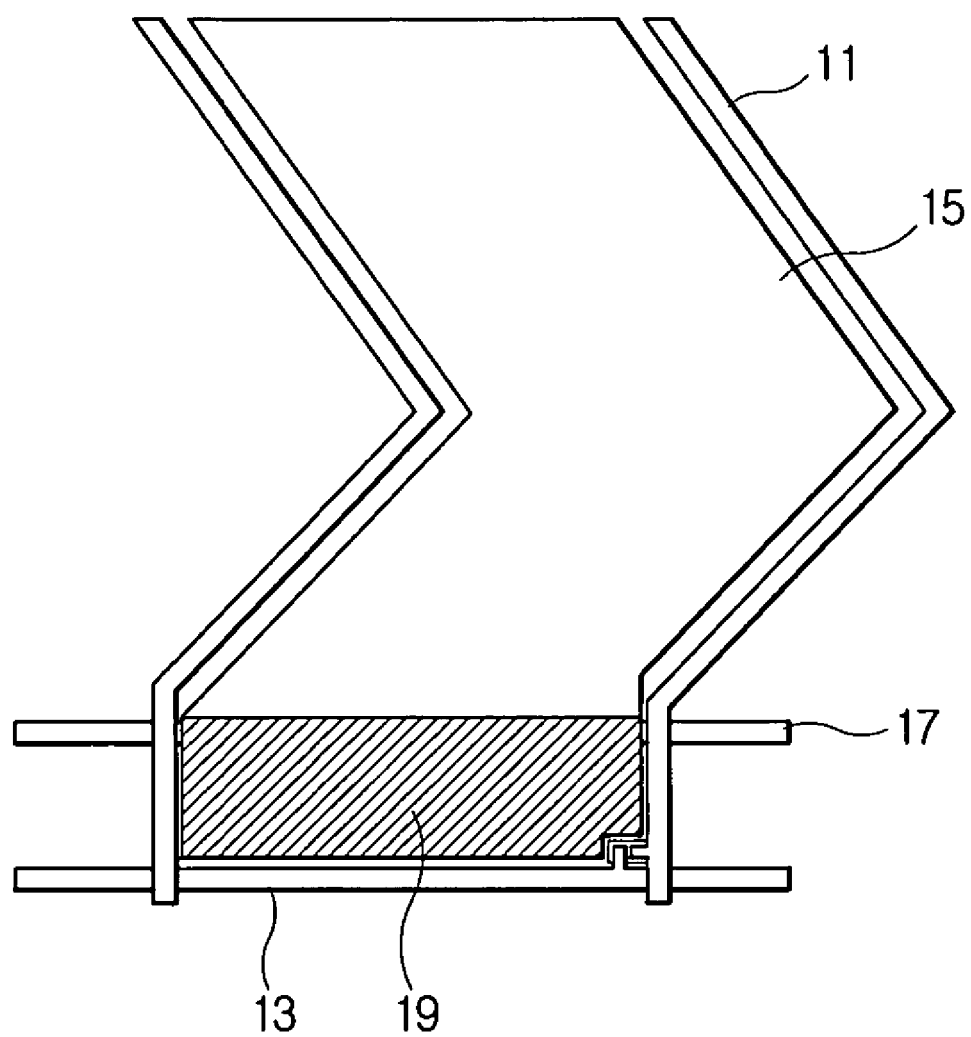
FIG. 2 is a plan view schematically illustrating the pixel of the LCD according to a first embodiment of the present invention.

With the foregoing pixel structure, an aperture ratio is improved, but a pixel structure illustrated in FIG. 2 is preferable in order to get a more rapid response speed.

That is, the angled structure illustrated in FIG. 1 causes the length of the data line 1 to be more increased than that of a conventional pixel structure having a rectangular shape, so that resistance and capacity of the data line are increased, thereby increasing a signal delay of the data line and lowering the response speed. To compensate these problems, the preferable pixel structure illustrated in FIG. 2 is preferable.

As shown in FIG. 2, a data line 11 and a gate line 13 have a matrix shape and surround a pixel domain. Further, the pixel domain comprises a pixel electrode 15 connected to a TFT element, and a common electrode line employed as a storage capacitor electrode 17.

In FIG. 2, the "storage on common" type storage capacitor 19 is illustrated, but the storage capacitor is not limited thereto and may be the "storage on gate" type.

Opposite sides of the storage capacitor 19 are parallel to a gate line 13 like the conventional pixel structure, and other lateral sides thereof are perpendicular to the gate line 13. Further, a data line 11 adjacent to the storage capacitor 19 is partly perpendicular to the gate line 13. Here, a section of the data line 11 perpendicular to the gate line 13 will be called a reduction section. As shown in FIG. 2, the storage capacitor 19 is placed within the reduction section. The storage capacitor 19 does not extend out of the reduction section.

Here, it is preferable that the storage capacitor 19 and the data line 11 are not overlapped and designed to have a gap therebetween as minimum as possible in order to minimize lowering of the aperture ratio.

As shown in FIG. 2, when the lateral sides of the storage capacitor 19 and the data line 11 are perpendicular to the gate line 13, the total length of the data line is decreased as compared with that of the data line being at a predetermined angle to the gate line. This is because the size of each pixel is determined depending on the number of pixels provided in the panel of the LCD. For example, according as the data line being at a predetermined angle to the gate line is partly perpendicular to the gate line, if the total length of the data line 11 is decreased by 10%, the total resistance of the data line 11 is decreased by 10%. At the same time, the total capacity of the data line 11 is decreased by 10%, so that the signal delay is reduced by 10%, thereby enhancing the response speed.

In FIG. 2, the reduction section of the data line 11 is perpendicular to the gate line 13, but the reduction section is not limited thereto and may be at an angle lager than the predetermined angle to the gate line 13 only if the length of the data line 11 is decreased.

To further decrease the resistance and the signal delay of the data line, it is preferable that the data line 11 adjacent to the storage capacitor 19 and perpendicular to the gate line 13 is not overlapped with the pixel electrode 15.

When the pixel electrode 15 and the data line 11 are not overlapped, the aperture ratio may be lowered a little. However, picture quality of the LCD is prevented from lowering by a cross-talk, the signal delay, etc. caused because electrical capacity between the pixel electrode and a peripheral circuit is decreased.

As described above, in the case where the pixel electrode 15 and the data line 11 are not overlapped, a gap between the data line 11 and the pixel electrode 15 is preferably covered with a black matrix (BM), thereby preventing light from streaming.

The light streaming between the pixel electrode 15 and the data line 11 may lower the picture quality, so that the light should be blocked by an opaque material called the BM. Also, the BM is employed for blocking the light streaming through a place where it is impossible to control the liquid crystal alignment.

Figure 3:
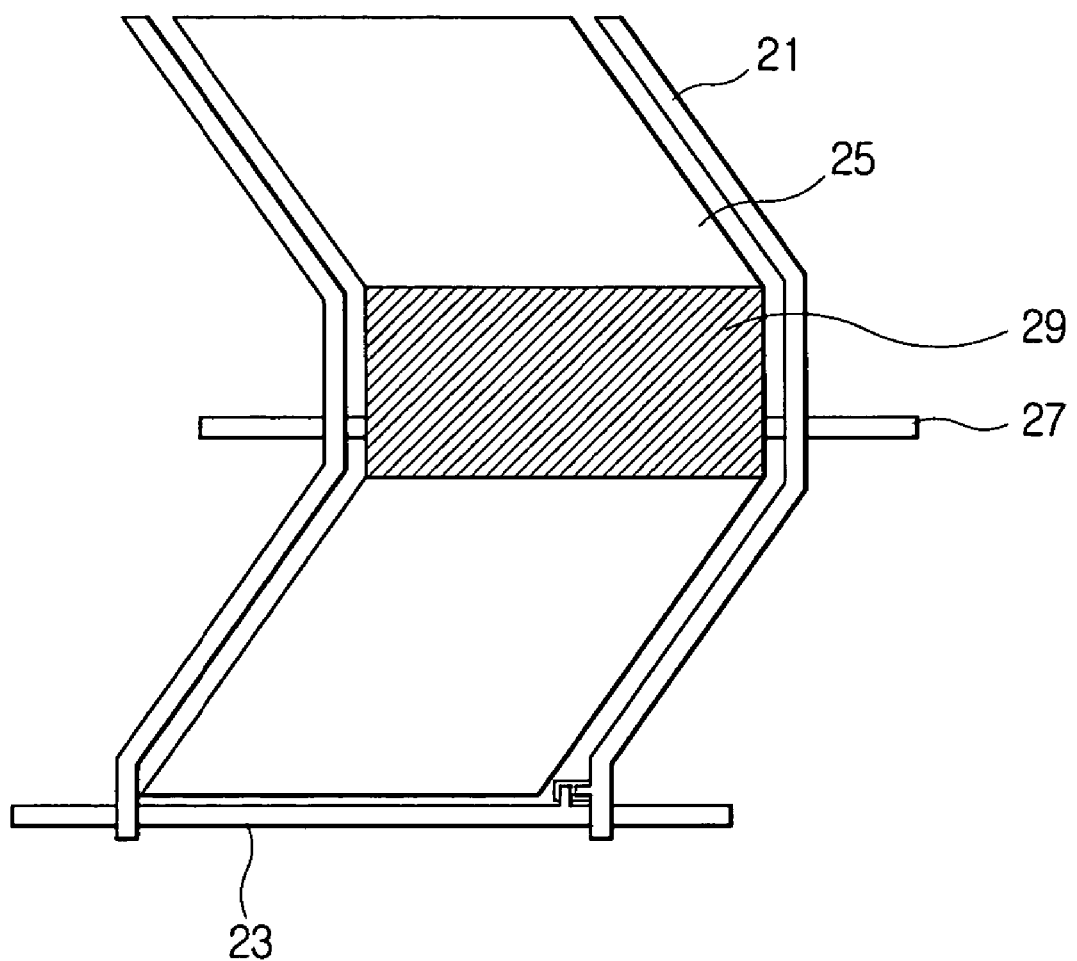
FIG. 3 is a plan view schematically illustrating the pixel of the LCD according to a second embodiment of the present invention.

FIG. 3 is a plan view schematically illustrating the pixel of the LCD according to a second embodiment of the present invention. As compared with FIG. 2 illustrating the storage capacitor 19 adjacent to the gate line 13, FIG. 3 illustrates a storage capacitor 29 placed in an angled part of a data line 21 having the angled structure, that is, placed in a part in which an inclined direction is changed.

As shown in FIG. 3, the storage capacitor 19 is placed within the reduction section. The storage capacitor 19 does not extend out of the reduction section. Hence, the reduction section of the data line 11 can be placed anywhere in the pixel domain, that is, the reduction section of the data line is illustrated in accompanying drawings by way of example but not limited to.

Figure 4:
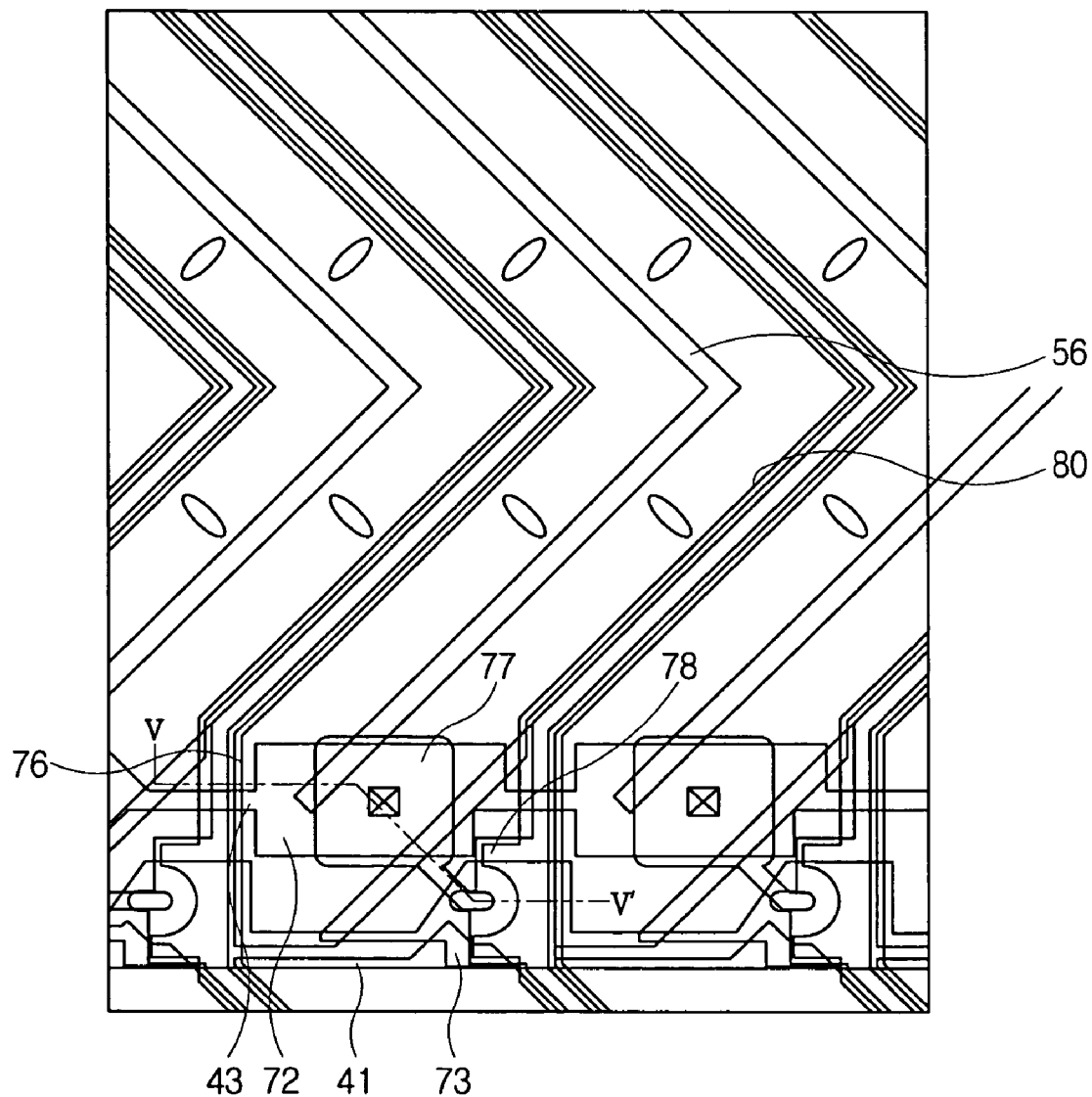
FIG. 4 is a plan view schematically illustrating a pixel arrangement according to a third embodiment of the present invention.
Figure 5:
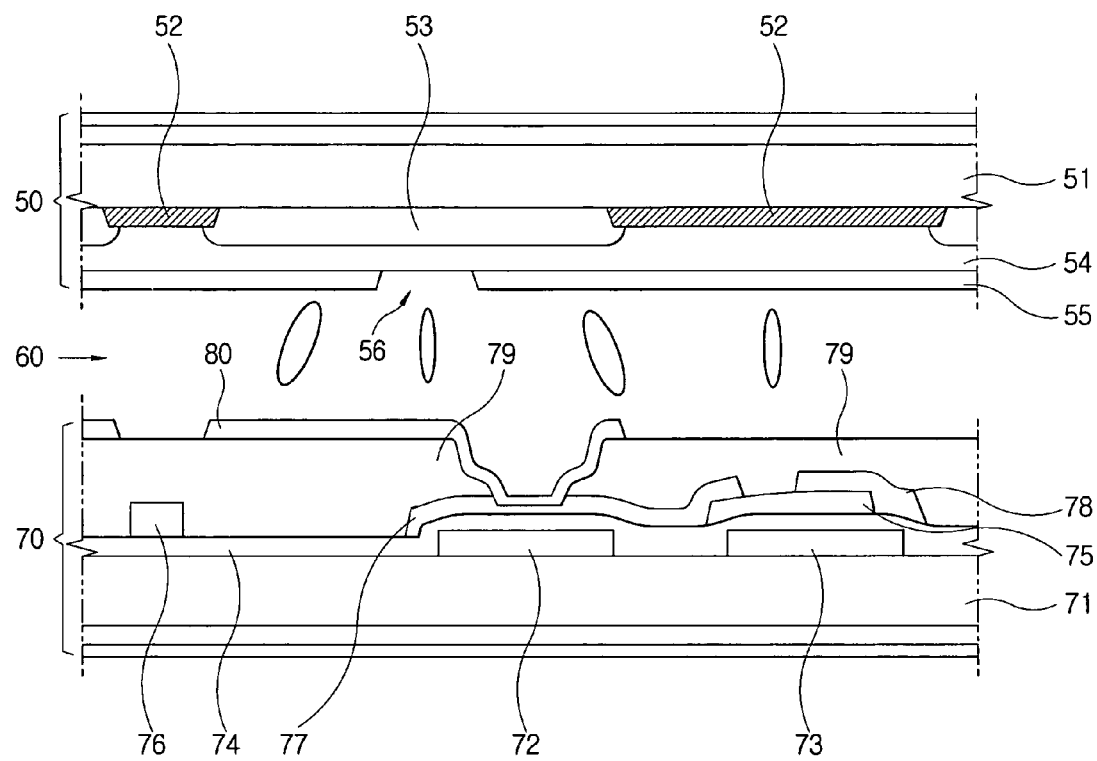
FIG. 5 is a sectional view of FIG. 4, taken along line V-V'.

FIG. 4 is a plan view schematically illustrating a pixel arrangement according to a third embodiment of the present invention; and FIG. 5 is a sectional view of FIG. 4, taken along line V-V'. As shown therein, the LCD according to the present invention comprises a common electrode plate 50, a TFT plate 70 opposite to the common electrode plate 50, a liquid crystal layer 60 sandwiched between the common electrode plate 50 and the TFT plate 70 and including liquid crystal molecules of which longitudinal axis is aligned vertically to the common electrode plate 50 and the TFT plate 70.

The TFT plate 70 comprises a gate line 41 transversely formed on an insulator substrate 71, and a gate electrode 73 having a ridge shape and connected to the gate line 41.

Further, on the insulator substrate 71 is formed a storage electrode line 43 and a storage electrode 72. The storage electrode line 43 extends transversely, and the storage electrode 72 forming the storage capacitor has an approximately rectangular shape and is connected to the storage electrode line 43.

The gate line 41, the gate electrode 73, the storage electrode line 43 and the storage electrode 72 are formed by a double layer: a first layer generally made of chrome or molybdenum alloy excellent in physical and chemical properties; and a second layer generally made of aluminum or silver alloy having low resistance. However, the gate line, the gate electrode, the storage electrode line and the storage electrode may be formed by a single layer or a triple layer.

The gate line 41, the gate electrode 73, the storage electrode line 43 and the storage electrode 72 are formed with a gate insulator film 74 thereon, and are formed with a semiconductor layer 75 on a part overlapped with the gate electrode 73 and a part under the data line 76.

On the gate insulator film 74 is formed the data line 76 crossing the gate line 41 and defining the pixel, a source electrode 78 extending to be partially overlapped with the semiconductor layer 75, and a drain electrode 77 separated from the source electrode 78 and extending to be overlapped with the storage electrode 72.

Further, a resistance contact layer (not shown) is formed between the semiconductor layer 75 and the drain electrode 77 and between the semiconductor layer 75 and the source electrode 78.

Here, the data line 76 is formed with the angled part and the reduction section every pixel, wherein the reduction section means a part of the data line 76 perpendicular to the gate line 41. Here, the angled structure of the data line 76 comprises the angled part at which the inclined direction of the data line 76 is changed being at a predetermined angle with respect to a reference side parallel with the gate line 41. Preferably, the data line inclined at an angle of approximately 45 degree to the reference side. The reduction section of the data line 76 is connected with the source electrode 78 and crossed with the gate line 41 and the storage electrode line 43.

In FIG. 4, the reduction section of the data line 76 is perpendicular to the gate line 41, but the reduction section is not limited thereto and may be at an angle lager than the predetermined angle to the gate line 41 only if the length of the data line 76 is decreased.

Further, the drain electrode 77 is extended by a rectangular shape with a large at a part connected with the pixel electrode 80, and is overlapped with the storage electrode 72. Thus, the drain electrode 77 is overlapped with the storage electrode 72 across only the gate insulator film 74, thereby forming the storage capacitor.

On the data line 76, the drain electrode 77 and the source electrode 78 is formed a passivation film 79 including an organic insulator. Here, the passivation film 79 is formed by exposing and developing a photosensitive organic material. As necessary, the passivation film 79 can be formed by applying and photoetching a non-photosensitive organic material. However, a process of forming the passivation film using the non-photosensitive organic material is complicated as compared with the process using the photosensitive organic material.

On some part of the drain electrode 77 is not formed the passivation film 79, so that the drain electrode 77 is partially exposed. Further, the passivation film 79 can be made of an inorganic material such as silicon nitride, silicon dioxide, or etc.

On the passivation film 79 is formed the pixel electrode 80 corresponding to a shape of the pixel and connected to the exposed part of the drain electrode 77. At this time, the edge of the pixel electrode 80 is preferably formed without overlapping with the data line 76, so that the aperture ratio may be lowered a little but the picture quality of the LCD is prevented from lowering due to a cross-talk, the signal delay, etc. because the electrical capacity between the pixel electrode and a peripheral circuit is decreased.

Here, an indium tin oxide (ITO) or an indium zinc oxide (IZO) can be used as the pixel electrode 80.

On the other hand, the common electrode plate 50 is comprises the BM 52 which is disposed under an upper substrate 51 made of a transparent insulating material such as glass and blocks the light, a color filter 53 for red, green and blue color, and an overcoat film 54 made of an organic material and disposed on the color filter 53. On the overcoat film 54 is formed a common electrode 55 including a transparent conductive material such as the ITO, the IZO, etc. and having a slit 56.

Here, the slit 56 is used in sectioning the domain and is preferably of 9 μm through 12 μm.

Here, the BM 52 is formed corresponding to the angled part and the reduction part of the data line 76 and corresponding to the TFT.

The color filter 53 is formed longitudinally along a column of the pixel divided by the BM 52, and is periodically angled corresponding to the pixel having the angled structure. Further, the slit 56 of the common electrode 55 is angled corresponding to the pixel having the angled structure and divides the pixel into a left side and a right side.

Consequently, the foregoing TFT plate 70 and the forgoing common electrode plate 50 are coupled, and the liquid crystal layer 60 is sandwiched therebetween, thereby forming a base panel of the LCD according to embodiments of the present invention.

In the state that an electric field is not applied between the pixel electrode 80 and the common electrode 55, the liquid crystal molecules contained in the liquid crystal layer 60 have a director of aligned vertically to the insulator substrate 71 and the upper substrate 51, and have negative permittivity and anisotropy.

The insulator substrate 71 as a lower substrate and the upper substrate 51 are arranged, allowing the pixel electrode 80 to overlap with the color filter 53 precisely. By doing so, the pixel is divided into a plurality of domains by the slit 56. At this time, the pixel is divided into the left side and the right side by the slit 56, but an upper side and a down side of the pixel with respect to the angled part are also different in the liquid crystal alignment, so that the pixel is substantially divided into four domains.

The LCD according to the embodiments of the present invention is completed by adding polarizers, a backlight, a compensating plate, etc. to the foregoing base panel. Here, the polarizers are respectively provided in opposite sides of the base panel. One of the polarizer has a transmission axis parallel to the gate line 41, and the other one of the polarizer has the transmission axis perpendicular to the gate line 41.

According to the present invention, when the electric field is applied to the liquid crystal, the liquid crystal belong to each domain is aligned in a direction perpendicularly to a longitudinal side of the domain. This direction is matched to a direction of when the liquid crystal is aligned by a lateral electric field created between two pixel electrodes 80, so that the lateral electric field assist the liquid crystal belong to the each domain to be aligned.

Further, the transmission axis of the polarizer is just perpendicular to or parallel to the gate line 41, so that not only a production cost of the polarizer can be decreased but also the alignment direction of the liquid crystal of every domain can be at an angle of 45 degree to the transmission axis of the polarizer, thereby maximizing brightness of the LCD.

Further, although the response speed can be decreased by a line resistance and a line load increased according as the angled structure causes total length of the data line to be increased, the data line 76 is partly formed with the reduction section perpendicular to the gate line 41, thereby preventing the response speed from being decreased.

Thus, the data line is inclined at a predetermined angle to the gate line and a reduction section portion is partly inclined at an angle that is larger than the predetermiend angle, so that the load of the data line is decreased, thereby reducing the signal delay. Consequently, the aperture ratio is maximized, and at the same time, the response speed is increased.

As described above, the present invention provides an LCD in which load of a data line is decreased and a signal delay is reduced, thereby maximizing the aperture ratio and increasing the response speed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display, comprising:
    a first substrate comprising a gate line, a data line, a pixel electrode and a storage electrode forming a storage capacitor with the pixel electrode;
    a second substrate disposed opposite to the first substrate and comprising a common electrode; and
    a liquid crystal layer which is operative in a vertical alignment mode and is sandwiched between the first substrate and the second substrate;
    wherein the pixel electrode forms a matrix and comprises a reference side which is parallel to the gate line, a pair of first sides which are parallel to each other and are inclined at a first angle to the reference side, and a pair of second sides which are parallel to each other and are inclined at a second angle larger than the first angle, and
    wherein the storage capacitor is placed within a reduction area where the pair of second sides face each other and does not extend out of the reduction area.

2. The liquid crystal display according to claim 1, wherein the storage capacitor is adjacent to the gate line.

3. The liquid crystal display according to claim 1, wherein the first angle is approximately 45 degrees.

4. The liquid crystal display according to claim 1, wherein the second angle is approximately 90 degrees.

5. A liquid crystal display, comprising:
    a first substrate comprising a gate line, a data line, a source electrode connected to the data line, a drain electrode opposite to the source electrode, a first passivation film formed on the source electrode and the drain electrode, a pixel electrode, and a storage electrode forming a storage capacitor with the pixel electrode;
    a second substrate disposed opposite to the first substrate and comprising a common electrode; and
    a liquid crystal layer which is operative in a vertical alignment mode and is sandwiched between the first substrate and the second substrate,
    wherein the pixel electrode forms a matrix and comprises a reference side which is parallel to the gate line, a pair of first sides which are parallel to each other and are inclined at a first angle to the reference side, and a pair of second sides which are parallel to each other and are inclined at a second angle larger than the first angle, and
    wherein the storage capacitor is placed within a reduction area where the pair of second sides face each other and does not extend out of the reduction area.

6. The liquid crystal display according to claim 5, wherein the first passivation film comprises an organic insulator.

7. The liquid crystal display according to claim 6, wherein the storage capacitor is adjacent to the gate line.

8. The liquid crystal display according to claim 6, wherein the first angle is approximately 45 degrees.

9. The liquid crystal display according to claim 6, wherein the second angle is approximately 90 degrees.

10. The liquid crystal display according to claim 5, wherein the second angle is approximately 90 degrees.

11. A liquid crystal display, comprising:
    a first substrate comprising a gate line, a data line, a thin film transistor (TFT), a pixel electrode, and a storage electrode forming a storage capacitor with the pixel electrode;
    a second substrate disposed opposite to the first substrate and comprising a common electrode, wherein the common electrode comprises a slit; and a liquid crystal layer which is operative in a vertical alignment mode and is sandwiched between the first substrate and the second substrate, wherein the TFT is connected to the pate line, the data line, and the pixel electrode, wherein the pixel electrode forms a matrix and comprises a reference side which is parallel to the gate line, a pair of first sides which are parallel to each other and are inclined at a first angle to the reference side, and a pair of second sides which are parallel to each other and are inclined at a second angle larger than the first angle, and wherein the storage capacitor is placed within a reduction area where the pair of second sides face each other and does not extend out of the reduction area.

12. The liquid crystal display according to claim 11, wherein the storage capacitor is adjacent to the gate line.

13. The liquid crystal display according to claim 11, wherein the first angle is approximately 45 degrees.

14. The liquid crystal display according to claim 11, wherein the second angle is approximately 90 degrees.

* * * * *